D. J. RUNDELL.
WAGON BRAKE.

No. 108,835.

Patented Nov. 1, 1870.

United States Patent Office.

DANIEL J. RUNDELL, OF SOUTH WESTERLO, NEW YORK.

Letters Patent No. 108,835, dated November 1. 1870.

IMPROVEMENT IN WAGON-BRAKES.

The Schedule referred to in these Letters Patent and making part of the same.

*To all whom it may concern:*

Be it known that I, DANIEL J. RUNDELL, of South Westerlo, in the county of Albany and State of New York, have invented a new and useful Improvement in Wagon-Brakes; and I do hereby declare that the following is a full, clear, and exact description thereof, which will enable others skilled in the art to make and use the same, reference being had to the accompanying drawing forming part of this specification.

Similar letters of reference indicate corresponding parts.

Figure 1:
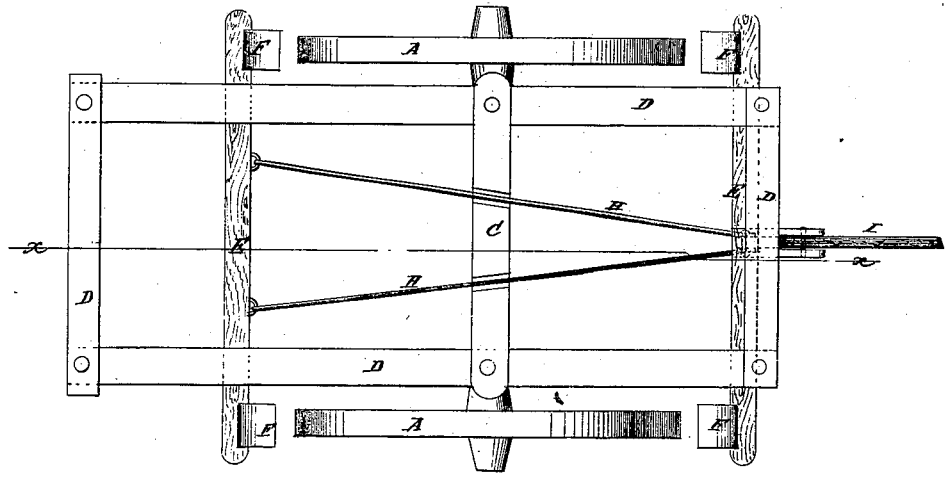
Figure 1 is a top view of the rear part of a wagon to which my improved brake has been attached.
Figure 2:
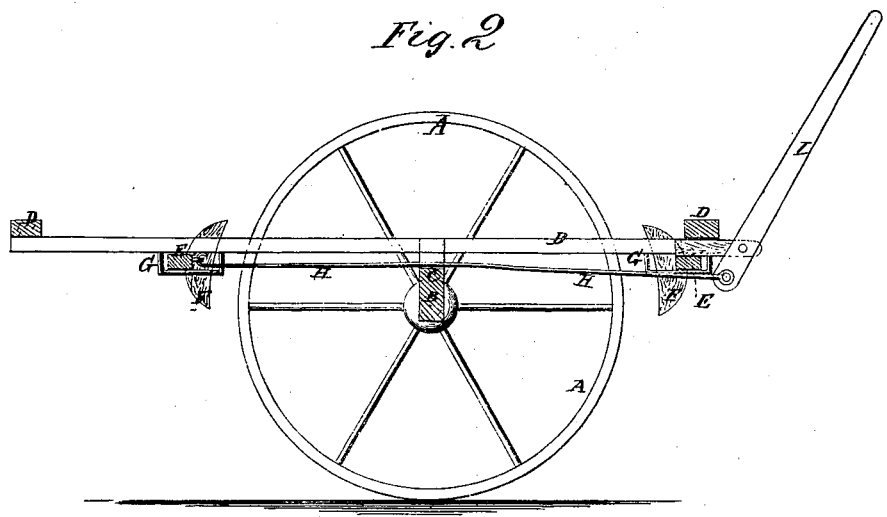
Figure 2 is a vertical longitudinal section of the same taken through the line $x\ x$, fig. 1.

My invention has for its object to furnish an improved brake, which shall be simple in construction and effective in operation, being so constructed as to apply the brake-shoes to both the front and rear sides of the wheels at the same time and by the same operation; and It consists in the construction and combination of the various parts of the brake, as hereinafter more fully described.

A represents the rear wheels, B the rear axle, and C the rear bolster of a wagon, about the construction of which parts there is nothing new.

D represents the base or foundation-frame of a rack to which the brake is attached, though the brake can be attached with equal facility to an ordinary wagon-box.

E are the brake-bars, two of which are used, and to the ends of which are attached brake-shoes F in the ordinary manner. The brake-bars E are placed in and supported by the keepers G attached to the frame D.

To the forward brake-bar E are attached two (more or less) rods, H, which extend back through notches in the upper side of the bolster C, through the openings or spaces between the bolster and axle, or through notches in the under side of the false bolster when a false bolster is used.

The rear end or ends of the rod or rods H are pivoted to the lower end of the lever I, which is pivoted to the rear brake-bar E or to short arms attached to said brake-bar.

The upper end of the lever I extends up at the rear of the wagon, and should have a rope attached to it and extending to the driver upon his seat, or upon the top of the load, so that he can conveniently apply the brake when required.

By this construction, when the lever I is operated one or the other of the brake-bars E will be moved so as to bring its shoes F in contact with the wheels which bar and shoes then act as a fulcrum to draw the other brake-bar and its shoes against the other side of the wheels, when each brake-bar acts as a fulcrum to the other and the whole power of the leverage is applied to the wheels.

When the lever I is released its weight and the friction of the wheels at once throw the brake-bar back to their former position.

It should be observed that the keepers G should be of such a length as to limit the movement of the bars E when moving back from the wheels, so that the outer ends of said keepers may act as stops to said bars and as fulcrums to aid in pushing back the said bars from the wheels.

Having thus described my invention,

I claim as new, and desire to secure by Letters Patent—

The combination of the two brake-bars E, with their shoes F, keepers G, rod or rods H, and lever I, with each other and with the wheels and rack-frame or box of the wagon, substantially as herein shown and described and for the purpose set forth.

DANIEL J. RUNDELL.

Witnesses:
H. E. ROBBINS,
GEO. W. ROBBINS